F. A. SCHULZ.
SPLIT COLLAR.
APPLICATION FILED MAR. 20, 1911.
1,029,950.
Patented June 18, 1912.
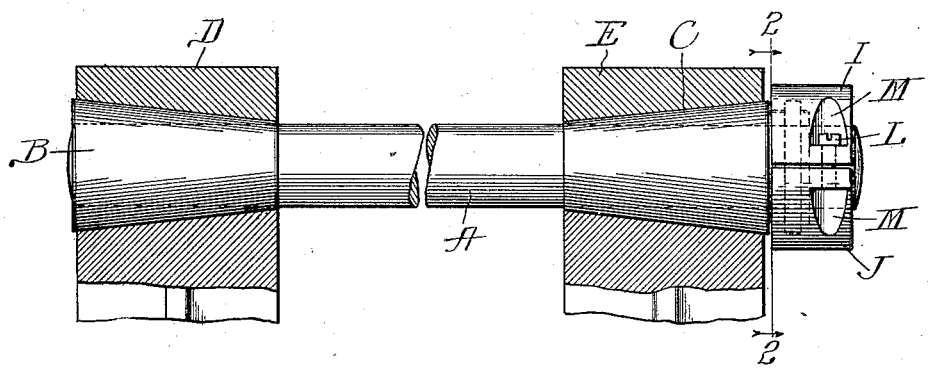
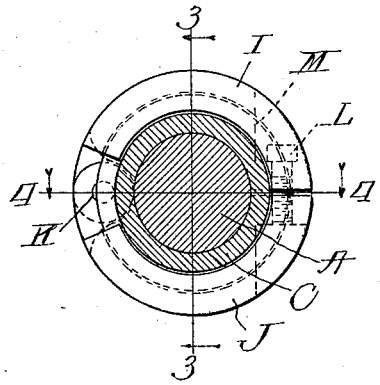
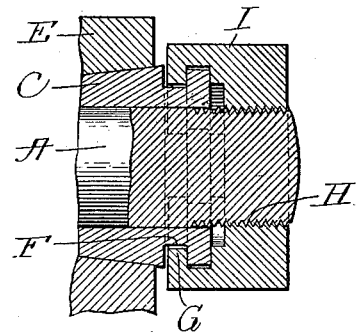
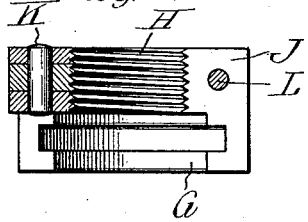
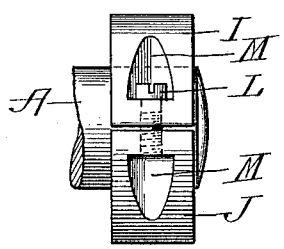
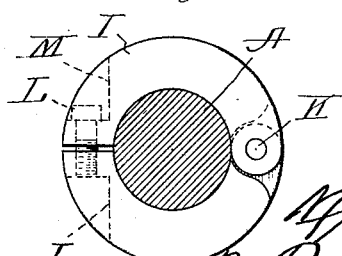

UNITED STATES PATENT OFFICE.

FRITZ A. SCHULZ, OF CHICAGO, ILLINOIS.

SPLIT COLLAR.

1,029,950.  Specification of Letters Patent.  Patented June 18, 1912.

Application filed March 20, 1911. Serial No. 615,763.

*To all whom it may concern:*

Be it known that I, FRITZ A. SCHULZ, a citizen of the United States, residing at Chicago, in the county of Cook and State of Illinois, have invented certain new and useful Improvements in Split Collars; and I do hereby declare the following to be a full, clear, and exact description of the invention, such as will enable others skilled in the art to which it appertains to make and use the same.

This invention relates to a novel construction in a removable collar for countershafts to engage either a smooth or a threaded cylindrical surface, being adapted in the latter case to act as a nut, the object being to provide a simple and efficient device of this character.

The invention consists in the features of construction and combinations of parts hereinafter fully described and claimed.

In the accompanying drawings illustrating the invention: Figure —1— is a view partly in section and partly in elevation showing a shaft equipped with conical bushings, one of which is adjustable longitudinally of the shaft to take up wear upon the same and in the bearings therefor, said shaft being equipped with a threaded collar constructed in accordance with my invention. Fig. —2— is a sectional view on the line 2—2 of Fig. —1—. Fig. —3— is a sectional view on the line 3—3 of Fig. —2—. Fig. —4— is a detail sectional view of the collar on the line 4—4 of Fig. —2—, the shaft and conical bushing being omitted. Figs. —5— and —6— are views in side elevation and end elevation respectively of a collar constructed in accordance with my invention, showing the same mounted upon a countershaft.

The main object of my invention is to provide a removable internally-threaded collar adapted to be mounted upon threaded portions of shafts between the ends thereof where said threads are cut into the shaft, and the ridges of the threads, therefore, are flush with the surface of the shaft so that it would be impossible to mount an ordinary nut or threaded collar to engage said threads.

A further object of the invention is to provide a split collar for countershafts which may be mounted upon the shaft between pulleys thereon without necessitating removal of the latter or providing greater space therebetween than the length of the collar.

A further object of the invention is to provide a split collar the parts of which are permanently hinged together to prevent separation and loss thereof.

A still further object of the invention is to provide a split collar which, when mounted upon a shaft, presents no projections beyond the periphery thereof upon which the clothing or hair of the operatives may be caught and personal injury thus inflicted.

My invention is particularly adapted for use in connection with spindle bearings of the conical, relatively adjustable type described and claimed in Letters Patent No. 814,168 granted to me on the sixth day of March, 1906. The said bearings are applicable to machines of various types, some of which are equipped with relatively long shafts.

I have illustrated a shaft A in Fig. —1— which is equipped with a conical bushing B preferably shrunk thereon or otherwise held rigid therewith. An oppositely-tapered bushing C is longitudinally-movable on said shaft A, being keyed or otherwise suitably held against rotation relatively to the shaft A, the nonrotatability of the bushing C on the shaft being relatively immaterial and outside of the scope of this invention. Said bushings are journaled in the bearings D and E. The said bushing C is provided adjacent its outer and larger end with an annular groove F in which the over-hanging flange G of a split collar engages. The latter is internally threaded and engages the threaded portion H of the shaft A, which if disposed between the ends of said shaft would be inaccessible to engagement by an ordinary nut or threaded collar for the reason that the ridges of the threads are flush with the periphery of the shaft.

The said split collar consists of two members I and J each of which is very slightly less than semi-cylindrical, said respective members being provided at one end each with interfitting, substantially cylindrical projections through which a pin K is passed to hinge the said members I and J together. The said pin K is suitably rendered incapable of removal except by the application of force in any well-known manner, as for example, by rendering the openings therefor in the projections of one member relatively smaller than in the projection of the other member so that said pin must be driven into place and will be firmly held by friction, without however, interfering with free relative pivotal movement of said members I and J. Each of said members carries substantially one-half of the overhanging flange G, the latter being engaged in the annular groove F of the bushing C by separating the free end portions of said members I and J sufficiently to receive the grooved end of said bushing therebetween and then closing the same as will be obvious.

In the opposed free ends of said members I and J there are provided a smooth opening for the free passage of the shank of a set screw L and a threaded opening registering therewith and adapted to engage the shank of said screw. Recesses M are provided in the periphery of each member by cutting out a portion thereof concentric with the opening for the passage of the shank of the said set screw L. As previously stated each of said members I and J is slightly less than semicylindrical. In the manufacture thereof the rough members I and J are first hinged together and then the openings for the passage of the set screw L are provided therein and the latter inserted. A thin plate is then engaged between the opposing ends of said members by turning said set screw to draw them toward each other and the collar thus formed is then turned off externally, bored and threaded, and is then ready for use.

After mounting the collar upon the threaded portion of the shaft A and in engagement with the bushing C, movement of the collar longitudinally of the shaft is communicated to the said bushing, the latter being thus nicely adjustable. After such adjustment has been effected the set screw L may be turned to so firmly clamp the collar upon the shaft as to prevent the same from being rotated relatively thereto except by the application of great force.

The collar, as shown in Figs. —5— and —6—, similarly constructed but devoid of the overhanging flange G and smoothly bored, is particularly adapted for use on countershafts or whenever required, being capable of insertion in any space between pulleys or the like equal to its length without necessitating the loosening or removal of the bearings for said shaft or its equivalent.

The collar not only presents the advantage of convenience in mounting and removal thereof, and the avoidance of indentation of the shaft as by the use of set screws bearing directly upon the same, but when in place on the shaft presents no projection beyond the periphery of the collar and therefore is not a constant menace to operatives.

The collar is also relatively cheap and durable.

I claim as my invention:

The combination with a shaft having a threaded portion and a member longitudinally-movable on said shaft and provided adjacent one end with an annular groove, of a split collar internally threaded to engage the threaded portion of said shaft and provided at one end with an overhanging flange coextensive with said collar and adapted to engage in said annular groove in said member and a set screw adjustably engaging said collar with said shaft, said collar comprising two members hinged together at a point diametrically opposite the ends connected together by said set screw, each of said members being slightly less than semi-cylindrical and providing an open space between the last-named ends thereof spanned by said set screw and permitting contact of said collar to firmly clamp the same against rotation on said shaft, substantially as and for the purpose set forth.

In testimony whereof I have signed my name in presence of two subscribing witnesses.

FRITZ A. SCHULZ.

Witnesses:
M. M. BOYLE,
H. L. HALE.

Copies of this patent may be obtained for five cents each, by addressing the "Commissioner of Patents. Washington, D. C."